(12) United States Patent
Valliani

(10) Patent No.: US 12,153,939 B2
(45) Date of Patent: *Nov. 26, 2024

(54) METHODS AND SYSTEMS FOR SUPERVISING DISPLAYED CONTENT

(71) Applicant: Safe Kids LLC, Vienna, VA (US)

(72) Inventor: Abbas Valliani, Vienna, VA (US)

(73) Assignee: Safe Kids LLC, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/173,980

(22) Filed: Feb. 11, 2021

(65) Prior Publication Data
US 2022/0114482 A1    Apr. 14, 2022

Related U.S. Application Data

(63) Continuation of application No. 17/066,255, filed on Oct. 8, 2020, now Pat. No. 10,949,774.

(51) Int. Cl.
| | |
|---|---|
| *G06F 9/451* | (2018.01) |
| *G06N 20/00* | (2019.01) |
| *G06V 40/10* | (2022.01) |
| *G06V 40/20* | (2022.01) |
| *G06V 20/52* | (2022.01) |

(52) U.S. Cl.
CPC ............ *G06F 9/451* (2018.02); *G06N 20/00* (2019.01); *G06V 40/10* (2022.01); *G06V 40/20* (2022.01); *G06V 20/52* (2022.01)

(58) Field of Classification Search
CPC .... G06N 20/00; G06F 9/451; G06K 9/00335; G06K 9/00362

USPC ............................................. 706/11
See application file for complete search history.

(56) References Cited

U.S. PATENT DOCUMENTS

| | | | |
|---|---|---|---|
| 2015/0082335 A1* | 3/2015 | Cobb | H04N 21/4542 725/28 |
| 2018/0349502 A1* | 12/2018 | Maycock | G06F 16/24578 |
| 2018/0352301 A1* | 12/2018 | Tofighbakhsh | H04N 21/252 |

OTHER PUBLICATIONS

International Search Report & Written Opinion of the International Searching Authority for PCT/US2021/053984, dated Nov. 3, 2021.
International Preliminary Report on Patentability for PCT/US2021/053984, dated Mar. 28, 2023.

* cited by examiner

*Primary Examiner* — Jin Ge
(74) *Attorney, Agent, or Firm* — WEW IP Law PLLC

(57) ABSTRACT

The present disclosure is directed to supervising displayed content. In particular, the methods and systems of the present disclosure may: generate data representing a plurality of images of interfaces displayed by a computing device configured to supervise content displayed to a user; determine, based at least in part on one or more machine learning (ML) models and the data representing the plurality of images, whether the interfaces displayed by the computing device include content of a type designated by a content supervisor of the user for identification; and generate data representing a graphical user interface (GUI) for presentation to the content supervisor, the GUI indicating whether the interfaces displayed by the computing device include content of the type designated for identification.

13 Claims, 19 Drawing Sheets

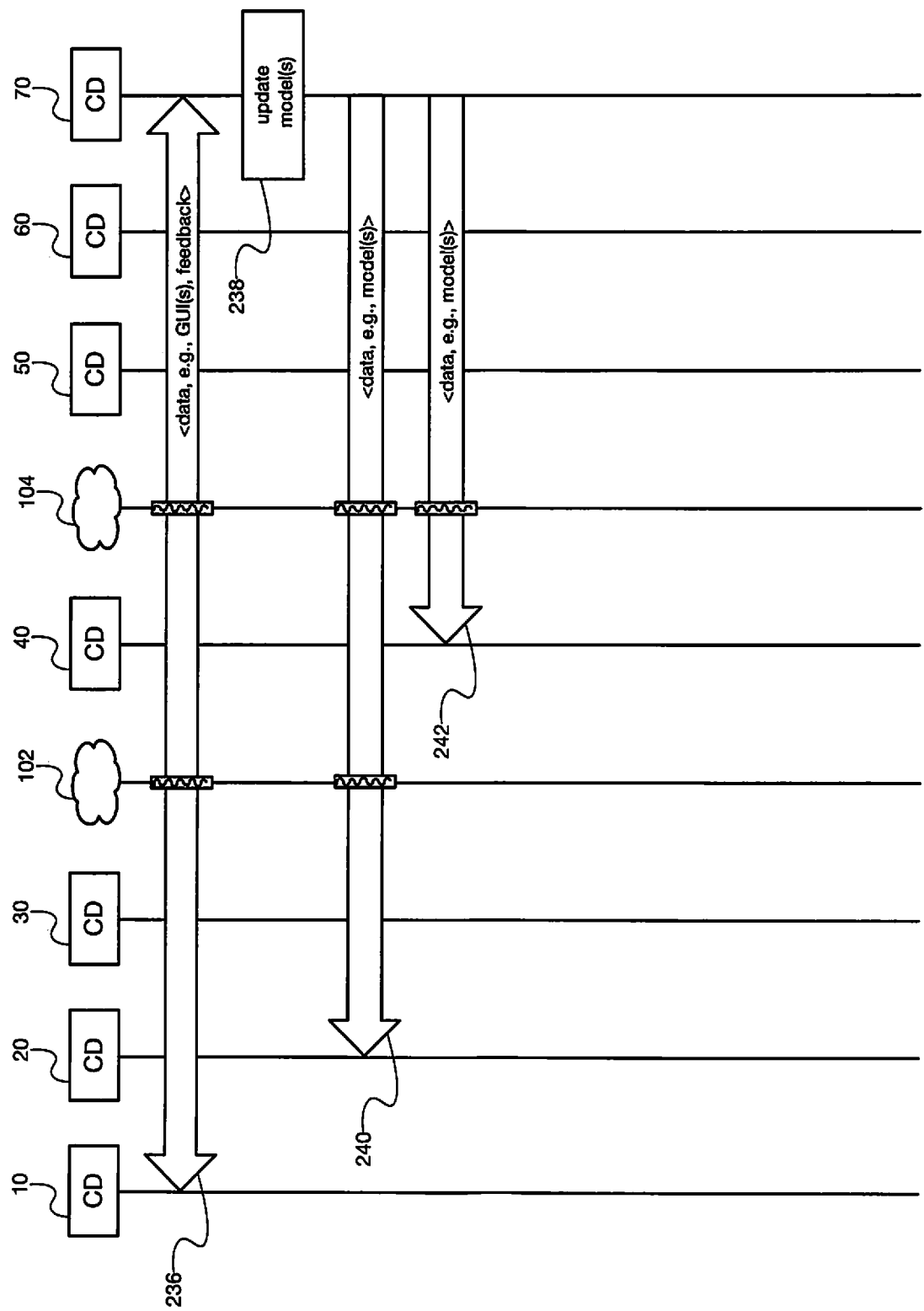

METHODS AND SYSTEMS FOR SUPERVISING DISPLAYED CONTENT

PRIORITY CLAIM

This application is a continuation of, and claims priority to, U.S. patent application Ser. No. 17/066,255, filed Oct. 8, 2020, and entitled "METHODS AND SYSTEMS FOR SUPERVISING DISPLAYED CONTENT," the disclosure of which is incorporated herein by reference in its entirety.

FIELD

The present disclosure relates generally to content supervision. More particularly, the present disclosure relates to methods and systems for supervising displayed content.

BACKGROUND

Computing devices (e.g., desktop computers, laptop computers, tablet computers, set-top devices, smartphones, wearable computing devices, and/or the like) are ubiquitous in modern society. They may support communications between their users, provide their users with entertainment, information about their environments, current events, the world at large, and/or the like. For certain users (e.g., children, employees, and/or the like) there may be a need and/or desire on the part of other individuals or organizations (e.g., parents, employers, and/or the like) to supervise, monitor, and/or the like content provided, displayed, and/or the like to the users by such devices.

SUMMARY

Aspects and advantages of embodiments of the present disclosure will be set forth in part in the following description, or may be learned from the description, or may be learned through practice of the embodiments.

One example aspect of the present disclosure is directed to a method. The method may include generating, by one or more computing devices, data representing a plurality of images of interfaces displayed by a device configured to supervise content displayed to a user. The method may also include determining, by the computing device(s) and based at least in part on one or more machine learning (ML) models and the data representing the plurality of images, whether the interfaces displayed by the device include content of a type designated by a content supervisor of the user for identification. The method may further include generating, by the computing device(s), data representing a graphical user interface (GUI) for presentation to the content supervisor. The GUI may indicate whether the interfaces displayed by the device include content of the type designated for identification.

Another example aspect of the present disclosure is directed to a system. The system may include one or more processors and a memory storing instructions that when executed by the processor(s) cause the system to perform operations. The operations may include receiving data representing an image of one or more interfaces displayed by a user device configured to supervise displayed content. The operations may also include determining, based at least in part on one or more ML models and the data representing the image, whether the interface(s) include content of a type designated, by a content supervisor of the user device, for identification.

A further example aspect of the present disclosure is directed to one or more non-transitory computer-readable media. The non-transitory computer-readable media may comprise instructions that when executed by one or more computing devices cause the computing device(s) to perform operations. The operations may include receiving data representing a plurality of images of interfaces. The operations may also include receiving data indicating, for each image of the plurality of images, whether one or more interfaces depicted by the image include content of a type designated for identification. The operations may further include generating, based at least in part on the data representing the plurality of images and the data indicating whether the interface(s) include content of the type designated for identification, one or more ML models configured to determine whether images of interfaces displayed by a user device configured to supervise displayed content depict content within the displayed interfaces of the type designated for identification.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in this specification, which makes reference to the appended figures, in which:

FIGS. 2A-C depict an example event sequence according to example embodiments of the present disclosure;

DETAILED DESCRIPTION

Example aspects of the present disclosure are directed to supervising displayed content. In particular, a user device (e.g., laptop computer, mobile device, and/or the like) may display one or more interfaces (e.g., associated with a web browser, application, and/or the like) to a user. In accordance with aspects of the disclosure, the user device may be configured, for example, by a content supervisor (e.g., parent, employer, and/or the like), to supervise content displayed to the user (e.g., a child, employee, and/or the like). Accordingly, the user device may generate data representing images (e.g., screenshots, and/or the like) of at least a portion of the interface(s) displayed to the user.

In accordance with aspects of the disclosure, based at least in part on the data representing the images of the interface(s)

and one or more machine learning (ML) models, the user device and/or one or more other computing devices may determine (e.g., via computer vision, and/or the like) whether the interface(s) displayed by the user device include content of a type designated by the content supervisor for identification (e.g., sexually explicit imagery, sexually explicit imagery of the user, imagery depicting violence, imagery associated with gambling, social-media content, content associated with bullying, suicidal ideation, psychological concerns, and/or the like).

The technology described herein may provide a number of technical effects and benefits. For example, the technology described herein may enable content supervision independent of the particular application, communication channel, and/or the like utilized to view such content. For example, by capturing images of the content actually displayed to a user, the technology described herein may effectively supervise a user utilizing an encrypted communication channel, secure browser, local storage media, unknown application, and/or the like. Similarly, the technology described herein may support content supervision, while simultaneously preserving user privacy, for example, by obviating the need for a content supervisor to manually review displayed content that may not pertain to content designated for identification, and/or the like.

With reference now to the Figures, example embodiments of the present disclosure will be discussed in further detail.

Figure 1:
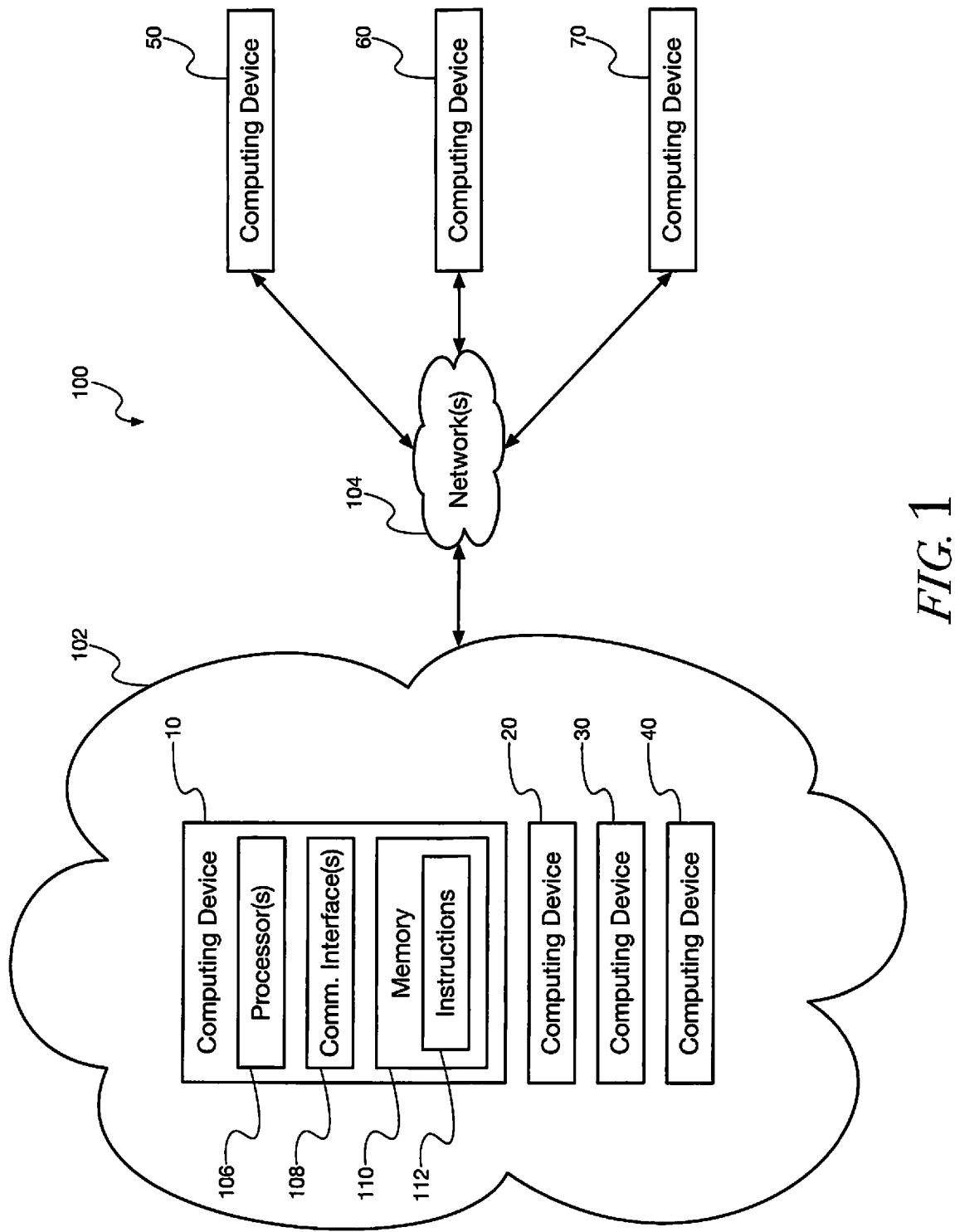
FIG. 1 depicts an example computing environment according to example embodiments of the present disclosure.

FIG. 1 depicts an example computing environment according to example embodiments of the present disclosure.

Referring to FIG. 1, environment 100 may include one or more computing devices (e.g., one or more desktop computers, laptop computers, set-top devices, tablet computers, mobile devices, smartphones, wearable devices, servers, and/or the like). For example, environment 100 may include computing devices 10, 20, 30, 40, 50, 60, and/or 70, any one of which may include one or more associated and/or component computing devices (e.g., a mobile device and an associated wearable device, and/or the like). Environment 100 may also include one or more networks, for example, network(s) 102 and/or 104 (e.g., one or more wired networks, wireless networks, and/or the like). Network(s) 102 may interface computing device(s) 10, 20, 30, and/or 40, with one another and/or computing device(s) 50, 60, and/or 70 (e.g., via network(s) 104, and/or the like).

Computing device 10 may include one or more processor(s) 106, one or more communication interfaces 108, and memory 110 (e.g., one or more hardware components for storing executable instructions, data, and/or the like). Communication interface(s) 108 may enable computing device 10 to communicate with computing device(s) 20, 30, 40, 50, 60, and/or 70 (e.g., via network(s) 102, 104, and/or the like). Memory 110 may include (e.g., store, and/or the like) instructions 112. When executed by processor(s) 106, instructions 112 may cause computing device 10 to perform one or more operations, functions, and/or the like described herein. It will be appreciated that computing device(s) 20, 30, 40, 50, 60, and/or 70 may include one or more of the components described above with respect to computing device 10.

Unless explicitly indicated otherwise, the operations, functions, and/or the like described herein may be performed by computing device(s) 10, 20, 30, 40, 50, 60, and/or 70 (e.g., by computing device 10, 20, 30, 40, 50, 60, or 70, by any combination of one or more of computing device(s) 10, 20, 30, 40, 50, 60, and/or 70, and/or the like).

Figure 2A:
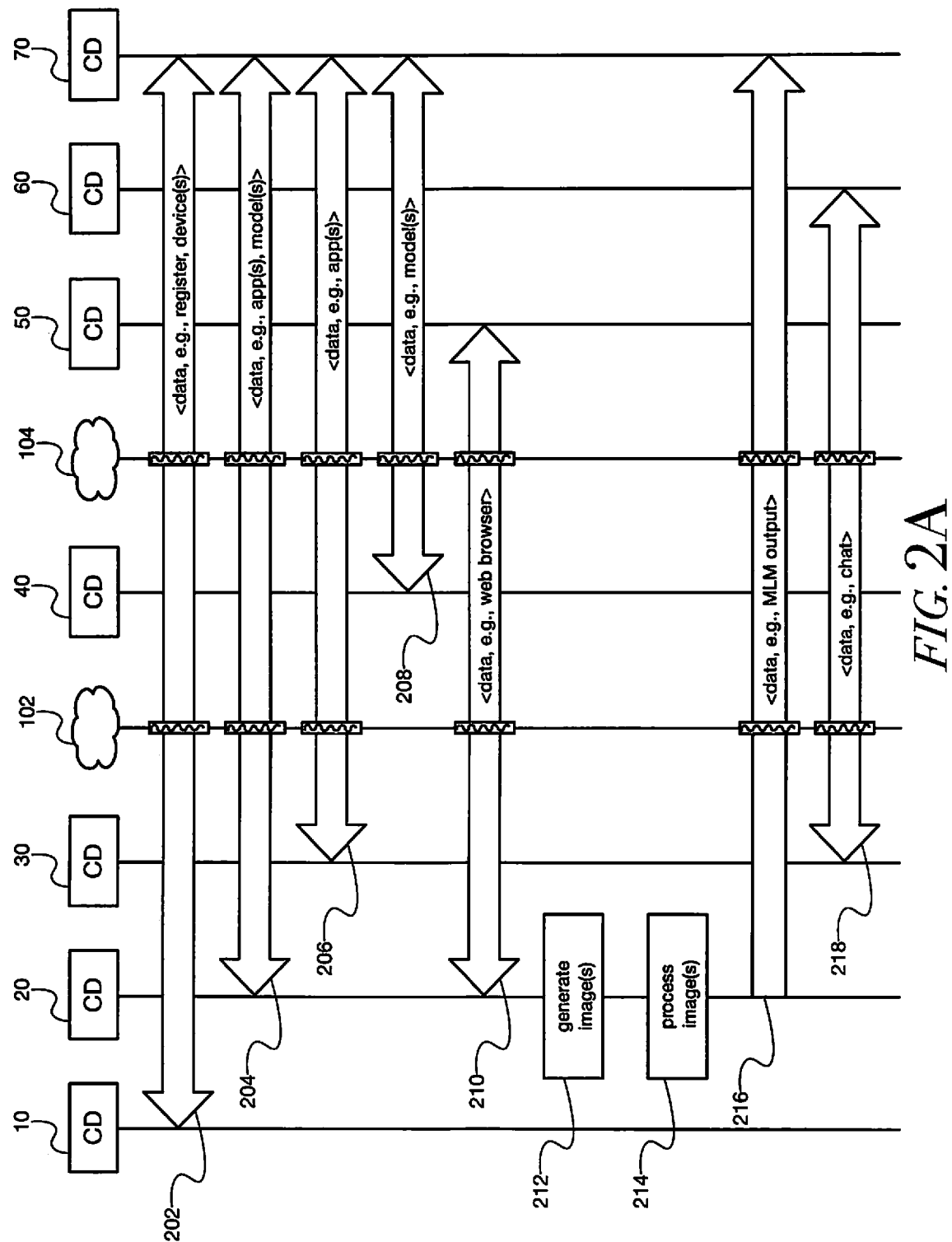
Figure 2B:
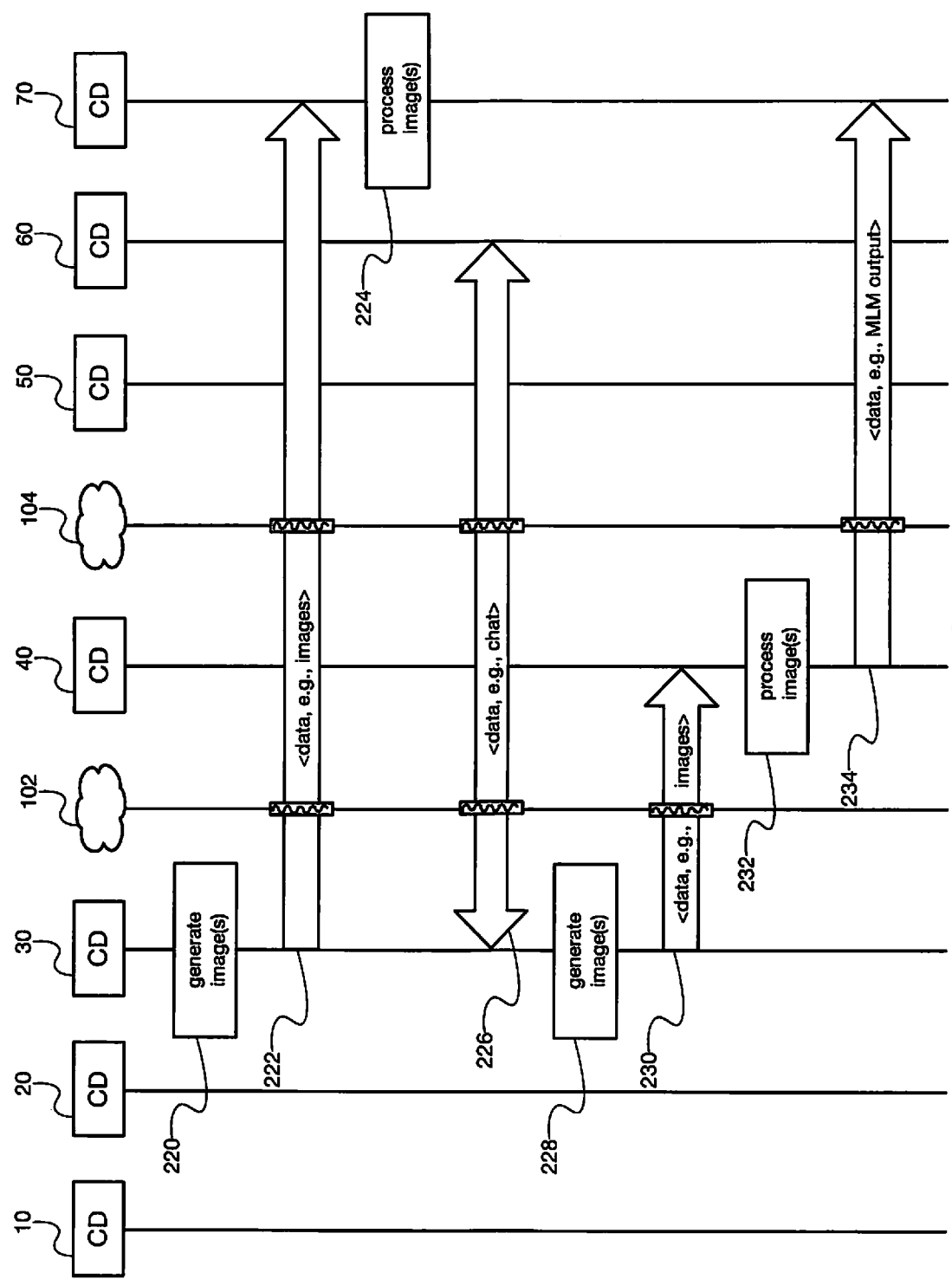

FIGS. 2A-C depict an example event sequence according to example embodiments of the present disclosure.

Referring to FIG. 2A, at (202), computing device 10 may communicate (e.g., via network(s) 102 and 104 (as indicated by the pattern-filled boxes over the lines extending downward from network(s) 102 and 104), and/or the like) data registering one or more user devices, accounts, and/or the like for content supervision with computing device 70. For example, computing device(s) 20 and/or 30 may be utilized by one or more users (e.g., children, employees, and/or the like) of a user (e.g., parent, employer, and/or the like) utilizing computing device 10, who may register such user device(s) and/or account(s) via a web interface provided by computing device 70, and/or the like (e.g., by providing identifying information associated with such user device(s), account(s), and/or the like).

At (204), computing device 70 may communicate data (e.g., one or more applications, machine learning (ML) models, and/or the like) to computing device 20, which may receive, store, and/or install such data, and/or the like. For example, a user (e.g., the parent, employer, and/or the like) may utilize computing device(s) 10 and/or 20 to download, install, and/or the like such data to computing device 20 in order to supervise content displayed by computing device 20, and/or the like. Similarly, at (206), computing device 70 may communicate data (e.g., one or more applications, and/or the like) to computing device 30, which may receive, store, and/or install such data, and/or the like. For example, a user (e.g., the parent, employer, and/or the like) may utilize computing device(s) 10 and/or 30 to download, install, and/or the like such data to computing device 30 in order to supervise content displayed by computing device 30, and/or the like. Additionally or alternatively, at (208), computing device 70 may communicate data (e.g., one or more applications, ML models, and/or the like) to computing device 40, which may receive, store, and/or install such data, and/or the like. For example, a user (e.g., the parent, employer, and/or the like) may utilize computing device(s) 10 and/or 40 to download, install, and/or the like such data to computing device 40 in order to supervise content displayed by computing device(s) 20, 30, and/or the like.

At (210), computing devices 20 and 50 may communicate data (e.g., associated with one or more web browser sessions, and/or the like). At (212), computing device 20 may generate data representing one or more images (e.g., screenshots, and/or the like) of one or more interfaces displayed by computing device 20 (e.g., associated with the web browser session(s), and/or the like). For example, the data communicated to computing device 20 at (204) may have configured computing device 20 to generate data representing such image(s). In some embodiments, the data communicated to computing device 20 (e.g., at step (204), and/or the like) may have configured computing device 20 to generate data representing such image(s) automatically, without user intervention, surreptitiously, periodically, in response to certain events, and/or the like.

Figure 3:
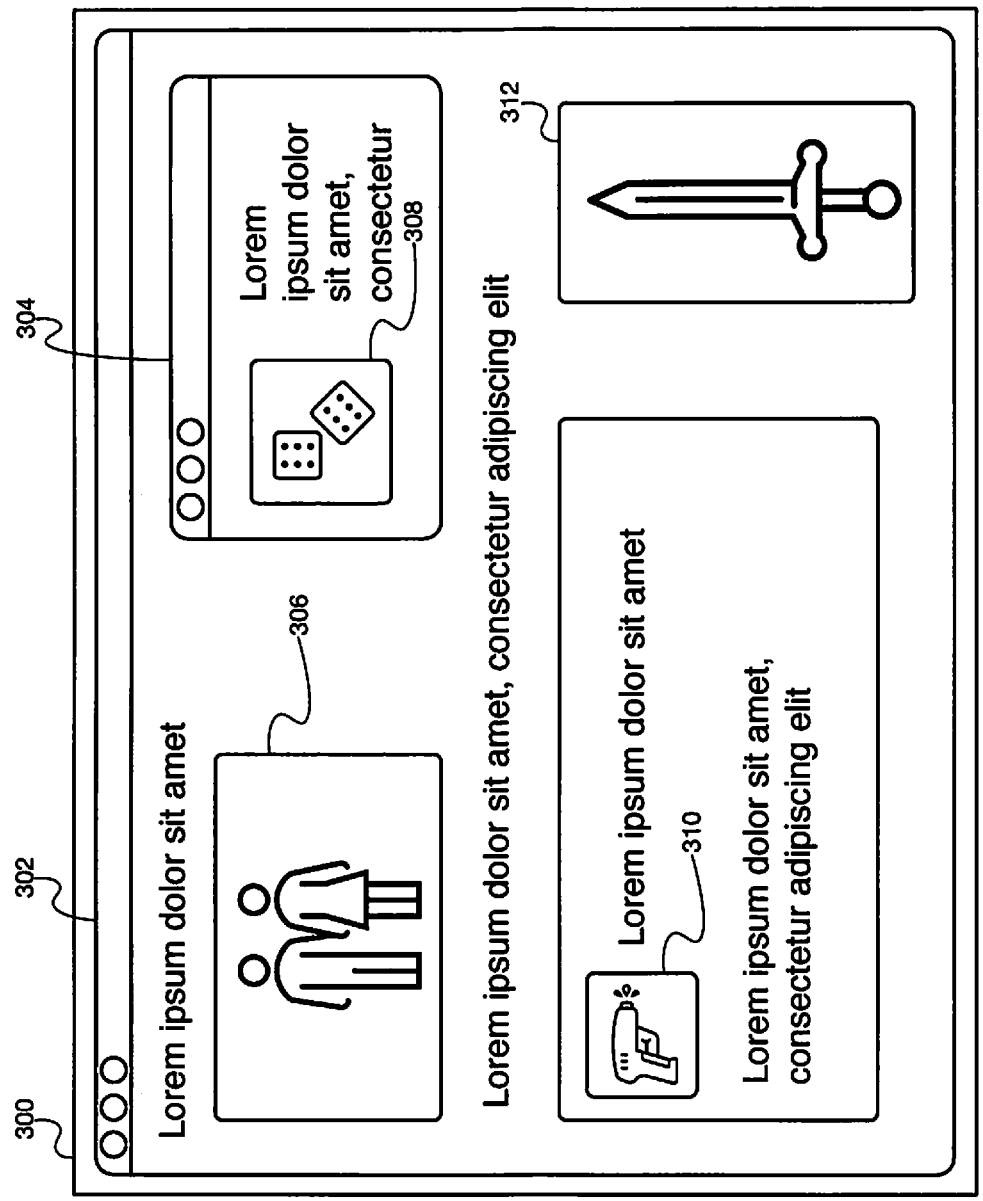
FIGS. 3-5 depict example images of interfaces according to example embodiments of the present disclosure.

For example, referring to FIG. 3, the data generated by computing device 20 may represent image 300. As illustrated, image 300 may depict interfaces 302 and 304 (e.g., associated with the web browser session(s), and/or the like). Interface 302 may include images 306, 310, and 312. Similarly, interface 304 may include image 308. Image 306 may comprise sexually explicit imagery, image 308 may comprise imagery associated with gambling, and images 310 and 312 may comprise imagery depicting violence, and/or the like.

Returning to FIG. 2A, at (214), computing device 20 may determine, based at least in part on the data representing the image(s) (e.g., image 300, and/or the like) and one or more ML models (e.g., communicated to computing device 20 at (204), and/or the like), whether the interface(s) displayed by computing device 20 (e.g., interfaces 302, 304, and/or the like) include content of a type designated by a content supervisor (e.g., as part of the data communicated at (202), and/or the like). For example, the data communicated at (202) may indicate that a content supervisor (e.g., parent, employer, and/or the like) has designated for identification interfaces that include sexually explicit imagery, sexually explicit imagery of the user of computing device 20, imagery depicting violence, imagery associated with gambling, social-media content, content associated with bullying, suicidal ideation, psychological concerns, and/or the like, and based at least in part on the data representing image 300 and the ML model(s), computing device 20 may determine that interface 302 includes sexually explicit imagery (e.g., image 306, and/or the like) and imagery depicting violence (e.g., images 310, 312, and/or the like). Similarly, based at least in part on the data representing image 300 and the ML model (s), computing device 20 may determine that interface 304 includes imagery associated with gambling (e.g., image 308, and/or the like).

In some embodiments, responsive to determining that image 300 depicts interface(s) including one or more of the content type(s) designated for identification, computing device 20 may temporarily disable its display, omit, obfuscate, and/or the like one or more portions of the displayed interface(s) (e.g., corresponding to image(s) 306, 308, 310, 312, and/or the like), provide one or more prompts to the user indicating such determination has been made, and/or the like.

At (216), computing device 20 may generate (e.g., based on output from the ML model(s), and/or the like) data indicating whether the displayed interface(s) include content of one or more of the types designated by the content supervisor for identification and may communicate such data to computing device 70, which may receive the data. For example, computing device 20 may generate data indicating that interface 302 includes sexually explicit imagery (e.g., image 306, and/or the like) and imagery depicting violence (e.g., images 310, 312, and/or the like) and may communicate such data to computing device 70, which may receive the data. Similarly, computing device 20 may generate data indicating that interface 304 includes imagery associated with gambling (e.g., image 308, and/or the like) and may communicate such data to computing device 70, which may receive the data.

At (218), computing devices 30 and 60 may communicate data (e.g., associated with one or more chat sessions, and/or the like). Referring to FIG. 2B, at (220), computing device 30 may generate data representing one or more images (e.g., screenshots, and/or the like) of one or more interfaces displayed by computing device 30 (e.g., associated with the chat session(s), and/or the like). For example, the data communicated to computing device 30 at (206) may have configured computing device 30 to generate data representing such image(s).

Figure 4:
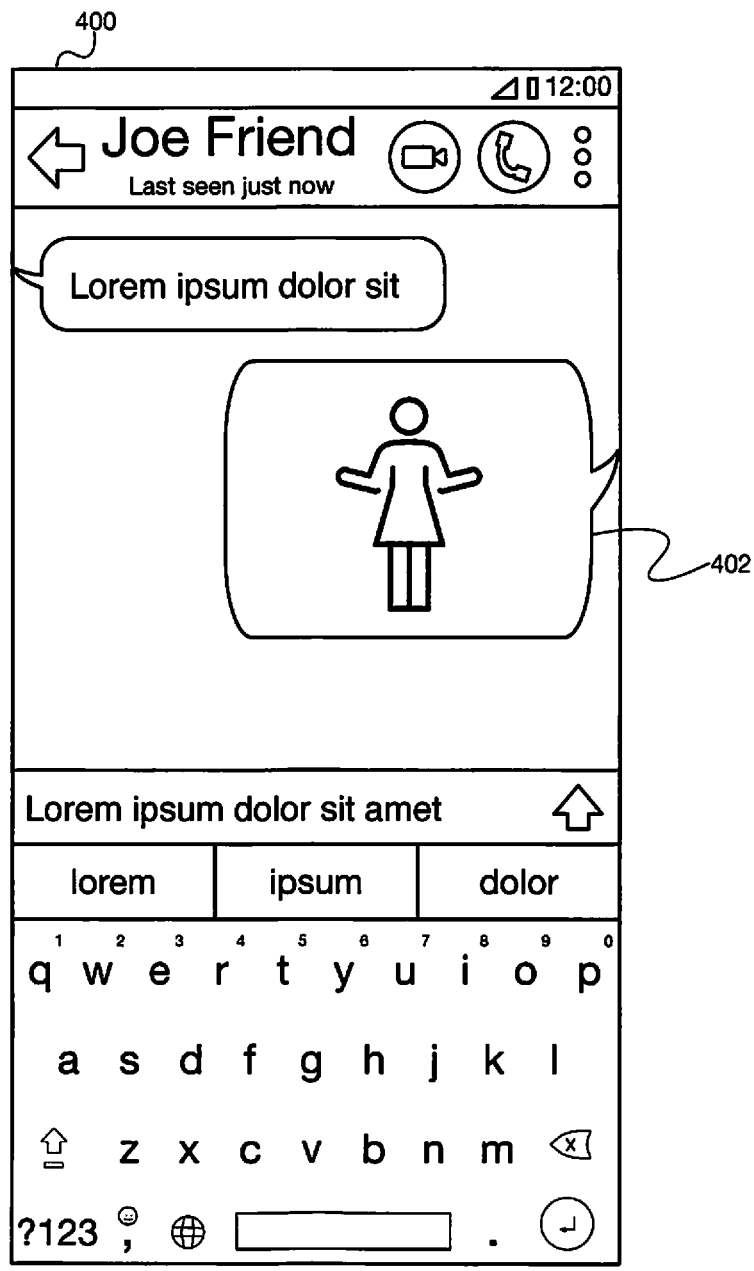

For example, referring to FIG. 4, the data generated by computing device 30 may represent image 400. As illustrated, image 400 may depict a chat interface that includes image 402, which may comprise sexually explicit imagery of the user of computing device 30.

Returning to FIG. 2B, at (222), computing device 30 may communicate the data representing the image(s) (e.g., image 400, and/or the like) to computing device 70, which may receive the data. It will be appreciated that computing device 70 (e.g., a server, and/or the like) may be physically distinct and remotely located from computing device 30 (e.g., a user device, and/or the like).

At (224), computing device 70 may determine, based at least in part on the data representing the image(s) (e.g., image 400, and/or the like) and one or more ML models, whether the interface(s) displayed by computing device 30 (e.g., the chat interface, and/or the like) include content of a type designated by a content supervisor (e.g., as part of the data communicated at (202), and/or the like). For example, the data communicated at (202) may indicate that a content supervisor (e.g., parent, employer, and/or the like) has designated for identification interfaces that include sexually explicit imagery, sexually explicit imagery of the user of computing device 30, imagery depicting violence, imagery associated with gambling, social-media content, content associated with bullying, suicidal ideation, psychological concerns, and/or the like, and based at least in part on the data representing image 400 and the ML model(s), computing device 70 may determine that the chat interface depicted by image 400 includes sexually explicit imagery of the user of computing device 30 (e.g., image 402, and/or the like).

At (226), computing devices 30 and 60 may communicate data (e.g., associated with one or more chat sessions, and/or the like). At (228), computing device 30 may generate data representing one or more images (e.g., screenshots, and/or the like) of one or more interfaces displayed by computing device 30 (e.g., associated with the chat session(s), and/or the like). For example, the data communicated to computing device 30 at (206) may have configured computing device 30 to generate data representing such image(s).

Figure 5:
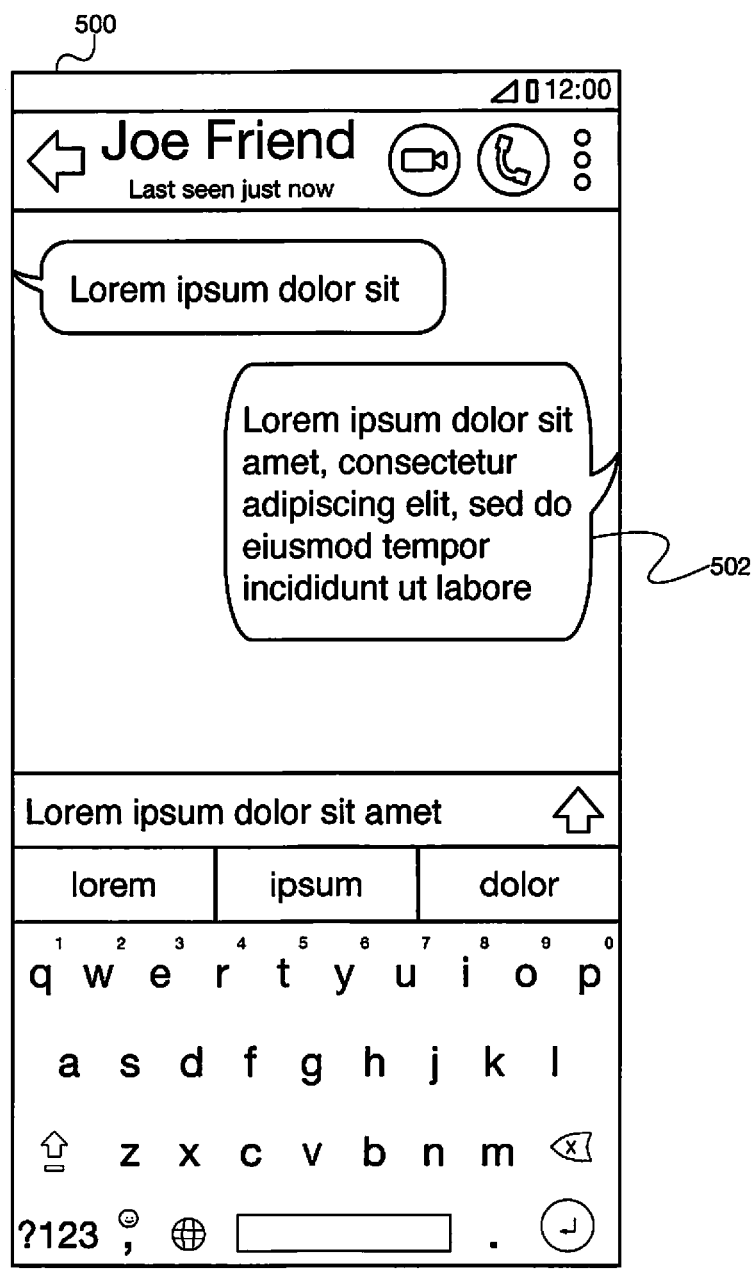

For example, referring to FIG. 5, the data generated by computing device 30 may represent image 500. As illustrated, image 500 may depict a chat interface that includes image 502 of text, which may comprise content associated with bullying, suicidal ideation, psychological concerns, and/or the like.

Returning to FIG. 2B, at (230), computing device 30 may communicate the data representing the image(s) (e.g., image 500, and/or the like) to computing device 40, which may receive the data. It will be appreciated that computing device 40 (e.g., a local network appliance, and/or the like) may be physically distinct and remotely located from computing device 30 (e.g., a user device, and/or the like) and computing device 70 (e.g., a server, and/or the like).

At (232), computing device 40 may determine, based at least in part on the data representing the image(s) (e.g., image 500, and/or the like) and one or more ML models, whether the interface(s) displayed by computing device 30 (e.g., the chat interface, and/or the like) include content of a type designated by a content supervisor (e.g., as part of the data communicated at (202), and/or the like). For example, computing device 40 may determine that the chat interface depicted by image 500 includes content (e.g., image 502, and/or the like) associated with bullying, suicidal ideation, psychological concerns, and/or the like.

At (234), computing device 40 may generate (e.g., based on output from the ML model(s), and/or the like) data indicating whether the displayed interface(s) include content of one or more of the types designated by the content supervisor for identification and may communicate such data to computing device 70, which may receive the data. For example, computing device 40 may generate data indicating that the chat interface depicted by image 500 includes content (e.g., image 502, and/or the like) associated with bullying, suicidal ideation, psychological concerns, and/or the like and may communicate such data to computing device 70, which may receive the data.

Figure 6:
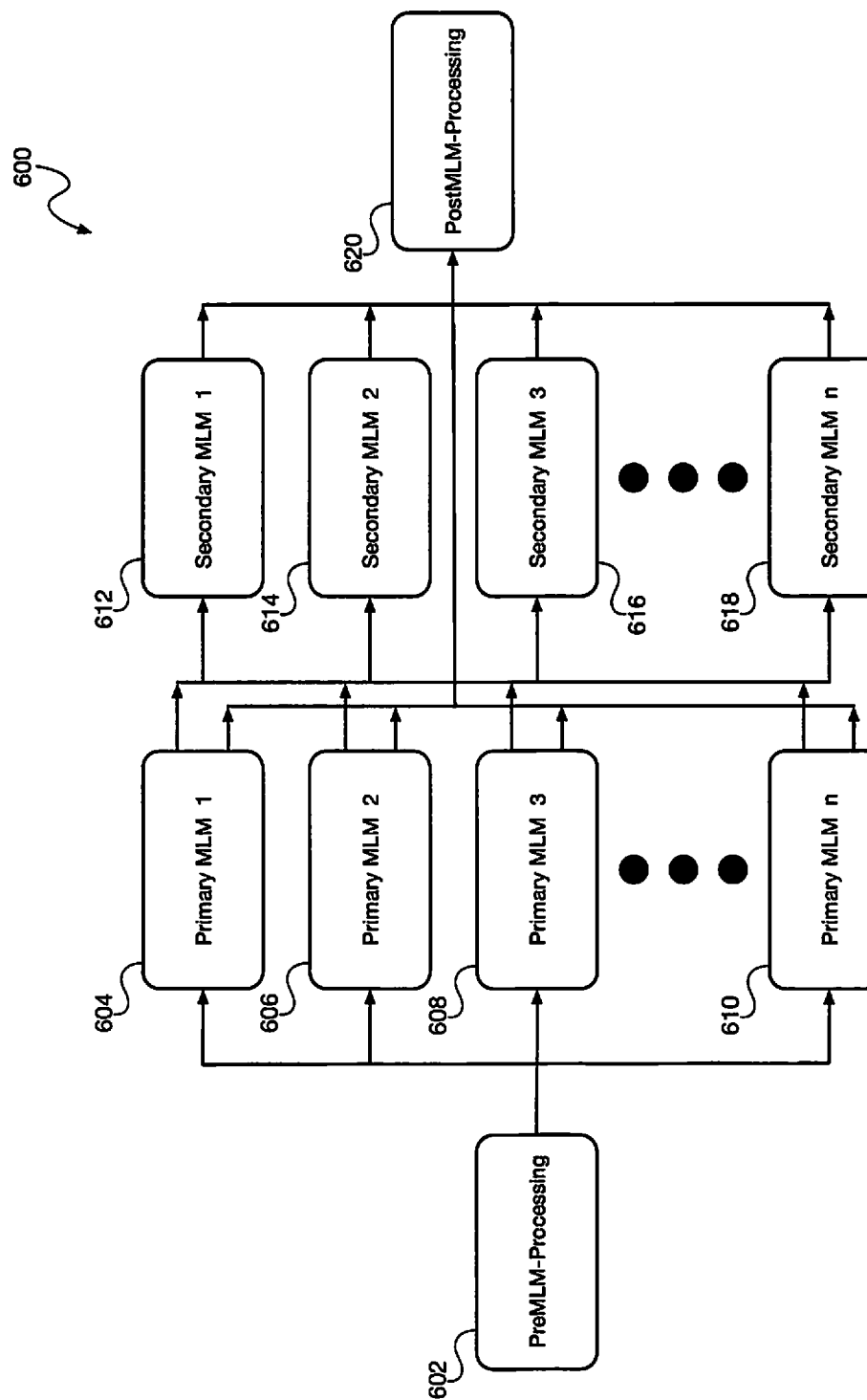
FIG. 6 depicts an example computing architecture according to example embodiments of the present disclosure.

FIG. 6 depicts an example computing architecture according to example embodiments of the present disclosure.

Referring to FIG. 6, architecture 600 may include pre-ML-model processing 602, processing via ML models 604, 606, 608, 610, and/or the like, processing via secondary ML models 612, 614, 616, 618, and/or the like, post-ML-model processing 620, and/or the like. Output from pre-ML-model processing 602 may be input to ML models 604, 606, 608, 610, and/or the like. Output from processing via ML models 604, 606, 608, 610, and/or the like may be input to post-ML-model processing 620. Additionally or alternatively, output from processing via ML models 604, 606, 608, 610, and/or the like may be input to secondary ML models 612, 614, 616, 618, and/or the like. Output from processing via secondary ML models 612, 614, 616, 618, and/or the like may be input to post-ML-model processing 620.

Pre-ML-model processing 602 may include, for example, receiving data representing an image of one or more interfaces displayed by a device configured to supervise content displayed to a user (e.g., computing device(s) 20, 30, and/or the like), reformatting, resizing, reframing, compressing, decompressing, and/or the like such image, as well as applying one or more other technologies (e.g., optical character recognition (OCR), and/or the like) to such image.

Processing via ML models 604, 606, 608, 610, and/or the like may include, for example, determining whether the interface(s) displayed by the device (e.g., as depicted by the image, and/or the like) include one or more of the content types designated (e.g., by the content supervisor, and/or the like) for identification. For example, the content supervisor may have designated multiple different and/or distinct content types for identification (e.g., sexually explicit imagery, sexually explicit imagery of the user of computing device(s) 20 and/or 30, imagery depicting violence, imagery associated with gambling, social-media content, content associated with bullying, suicidal ideation, psychological concerns, and/or the like).

In some embodiments, ML models 604, 606, 608, 610, and/or the like may include, for each content type of the designated content type(s), a different and distinct ML model for the content type (e.g., ML model 604 may be configured to determine whether the image depicts interface(s) including sexually explicit imagery, ML model 606 may be configured to determine whether the image depicts interface(s) including imagery depicting violence, ML model 608 may be configured to determine whether the image depicts interface(s) including imagery associated with gambling, ML model 610 may be configured to determine whether the image depicts interface(s) including content associated with bullying, suicidal ideation, psychological concerns, and/or the like). In some of such embodiments, processing via ML models 604, 606, 608, 610, and/or the like may include, for each content type of the designated content type(s), determining, based at least in part on the ML model for the content type, whether the interface(s) displayed include content of the content type.

Additionally or alternatively, ML models 604, 606, 608, 610, and/or the like may include a common (e.g., the same, and/or the like) ML model configured to identify multiple of the different and distinct content types (e.g., ML model 604 may be configured to determine whether the image depicts interface(s) including sexually explicit imagery, imagery depicting violence, imagery associated with gambling, content associated with bullying, suicidal ideation, psychological concerns, and/or the like). In some of such embodiments, processing via ML models 604, 606, 608, 610, and/or the like may include, for each content type of the designated content type(s), determining, based at least in part on such common ML model, whether the interface(s) displayed include content of one or more of the content types.

In some embodiments, processing via ML models 604, 606, 608, 610, and/or the like may include, for example, determining whether the interface(s) displayed by the device (e.g., as depicted by the image, and/or the like) include one or more components of the content type(s) designated for identification (e.g., facial recognition of the user of computing device(s) 20 and/or 30, and/or the like).

In some embodiments, one or more bounded regions within the displayed interface(s) that include content of the designated type(s) may be determined. For example, computing device 70, and/or the like may determine bounded regions delineating image(s) 306, 308, 310, 312, and/or the like. In some of such embodiments, for each bounded region of the bounded region(s) within the interface(s) displayed, a value representing a likelihood that the bounded region includes content of the designated type(s) may be determined. For example, computing device 70, and/or the like may determine such values for each of the bounded regions delineating image(s) 306, 308, 310, 312, and/or the like.

In some embodiments, a value may be determined for the image representing a likelihood that the interface(s) depicted by the image include content of the designated type(s). In some of such embodiments, such a value may be determined based at least in part on the determined likelihood(s) that the bounded region(s) within the interface(s) depicted by the image include content of the designated type(s). For example, such a value may be determined in accordance with the following formula:

$$p(\text{image}) = 1 - [(1 - p(\text{region}_1))^* (1 - p(\text{region}_2))^* \ldots (1 - p(\text{region}_n))]$$

in which, p(image) corresponds to the likelihood (e.g., probability, and/or the like) that the interface(s) depicted by the image include content of the designated type(s); and $p(\text{region}_n)$ corresponds to the likelihood (e.g., probability, and/or the like) that bounded region n within the interface(s) depicted by the image includes content of the designated type(s).

Processing via secondary ML models 612, 614, 616, 618, and/or the like may include, for example, determining whether display of interface(s) determined to include one or more of the designated content type(s) was intentional, unintentional, and/or the like. For example, one or more of such model(s) may be configured (e.g., via supervised learning, unsupervised learning, and/or the like) to make such a determination (e.g., based on the frequency with which images determined to depict interface(s) including such content type(s) were contemporaneously displayed, and/or the like).

Additionally or alternatively, processing via secondary ML models 612, 614, 616, 618, and/or the like may include, for example, determining whether display of interface(s) determined to include one or more of the designated content type(s) indicates one or more behavior patterns (e.g., associated with user anxiety, distraction, unfocused or unproductive behavior, and/or the like) designated (e.g., by the content supervisor, and/or the like) for identification.

Post-ML-model processing 620 may include, for example, making one or more determinations based on combined output from pre-ML-model processing 602, processing via ML models 604, 606, 608, 610, processing via secondary ML models 612, 614, 616, 618, and/or the like, for example, determining based on a determination that an image depicts interface(s) including sexually explicit imagery and a determination (e.g., via facial recognition, and/or the like) that the interface(s) include imagery of the user of computing device(s) 20 and/or 30, that the interface(s) include sexually explicit imagery of the user of computing device(s) 20 and/or 30, and/or the like.

Figure 7A:
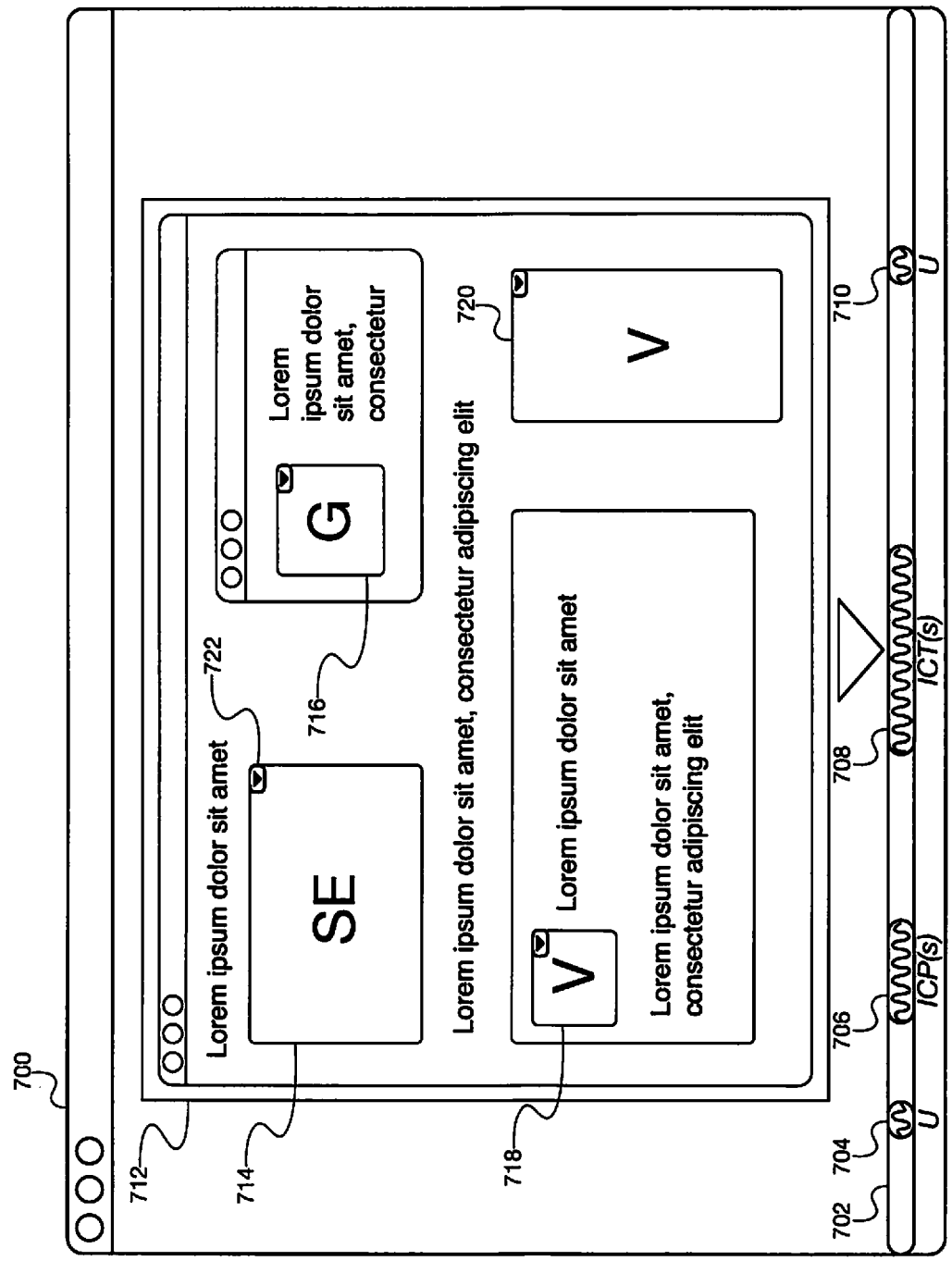
FIGS. 7A-C, 8A-C, and 9A-C depict example graphical user interfaces (GUIs) according to example embodiments of the present disclosure.

Referring to FIG. 2C, at (236), computing devices 10 and 70 may communicate data associated with one or more graphical user interfaces (GUIs) provided to a content supervisor (e.g., a parent, employer, user of computing device 10, and/or the like). For example, referring to FIG. 7A, computing device 70 may generate data representing GUI 700 and may communicate such data to computing device 10, which may receive the data.

GUI 700 may include element 702, which may depict a chronology (e.g., timeline, and/or the like) of the interface(s) displayed by computing device(s) 20, 30, and/or the like determined to include one or more of the content types and/or patterns designated (e.g., by the content supervisor, and/or the like) for identification. For example, elements 704, 706, 708, and/or 710 may indicate interface(s) displayed by computing device(s) 20, 30, and/or the like determined to include one or more of the content type(s) and/or pattern(s) designated for identification.

In some embodiments, GUI 700 may include one or more elements (e.g., labels, and/or the like) indicating the content type(s) and/or pattern(s) identified in association with such interface(s). For example, GUI 700 may include one or more elements (e.g., "U" labels, representing unintentional display of one or more of the content type(s) and/or pattern(s) designated for identification, and/or the like) in proximity to elements 704, 710, and/or the like. Similarly, GUI 700 may include one or more elements (e.g., an "ICP(s)" label, representing intentional display of one or more of the content pattern(s) designated for identification, and/or the like) in proximity to element 706, and/or the like; and GUI 700 may include one or more elements (e.g., an "ICT(s)" label, representing intentional display of one or more of the content type(s) designated for identification, and/or the like) in proximity to element 708, and/or the like.

GUI 700 may also include (e.g., in response to interaction with one or more portions of element 708, and/or the like) image 712, which may depict one or more portions of the interface(s) depicted by image 300 (e.g., interface(s) including or associated with one or more of the content type(s) and/or pattern(s) designated for identification, and/or the like). GUI 700 may also indicate whether the interface(s) depicted by image 300 include content associated with one or more of the content type(s) and/or pattern(s) designated for identification. For example, GUI 700 may (e.g., based on data generated, communicated, and/or the like at (236) and identifying the bounded region(s) within the interface(s), and/or the like) identify (e.g., highlight, frame, and/or the like), within image 712, images 714, 716, 718, and 720, which may respectively correspond to images 306, 308, 310, and 312. Additionally or alternatively, GUI 700 may (e.g., based on data generated, communicated, and/or the like at (236) and identifying the bounded region(s) within the interface(s), and/or the like) omit, obfuscate, and/or the like one or more portions, within image 712, corresponding to one or more portions of the interface(s) depicted by image 300 determined not to include content associated with one or more of the content type(s) and/or pattern(s) designated for identification (e.g., in order to visually distinguish such portions from portion(s) determined to include content associated with one or more of the content type(s) and/or pattern(s) designated for identification, and/or the like).

As illustrated, in some embodiments, images 714, 716, 718, and 720 may obscure, omit, and/or the like the respective content (or portions thereof) of images 306, 308, 310, and/or 312. For example, labels associated with one or more content types determined to be included in the depicted interface portions may be displayed in place of the underlying image content (e.g., the label "SE" for sexually explicit imagery may be displayed in lieu of image 306, the label "G" for imagery associated with gambling may be displayed in lieu of image 308, the label "V" for imagery depicting violence may be displayed in lieu of images 310 and 312, and/or the like).

Figure 7B:
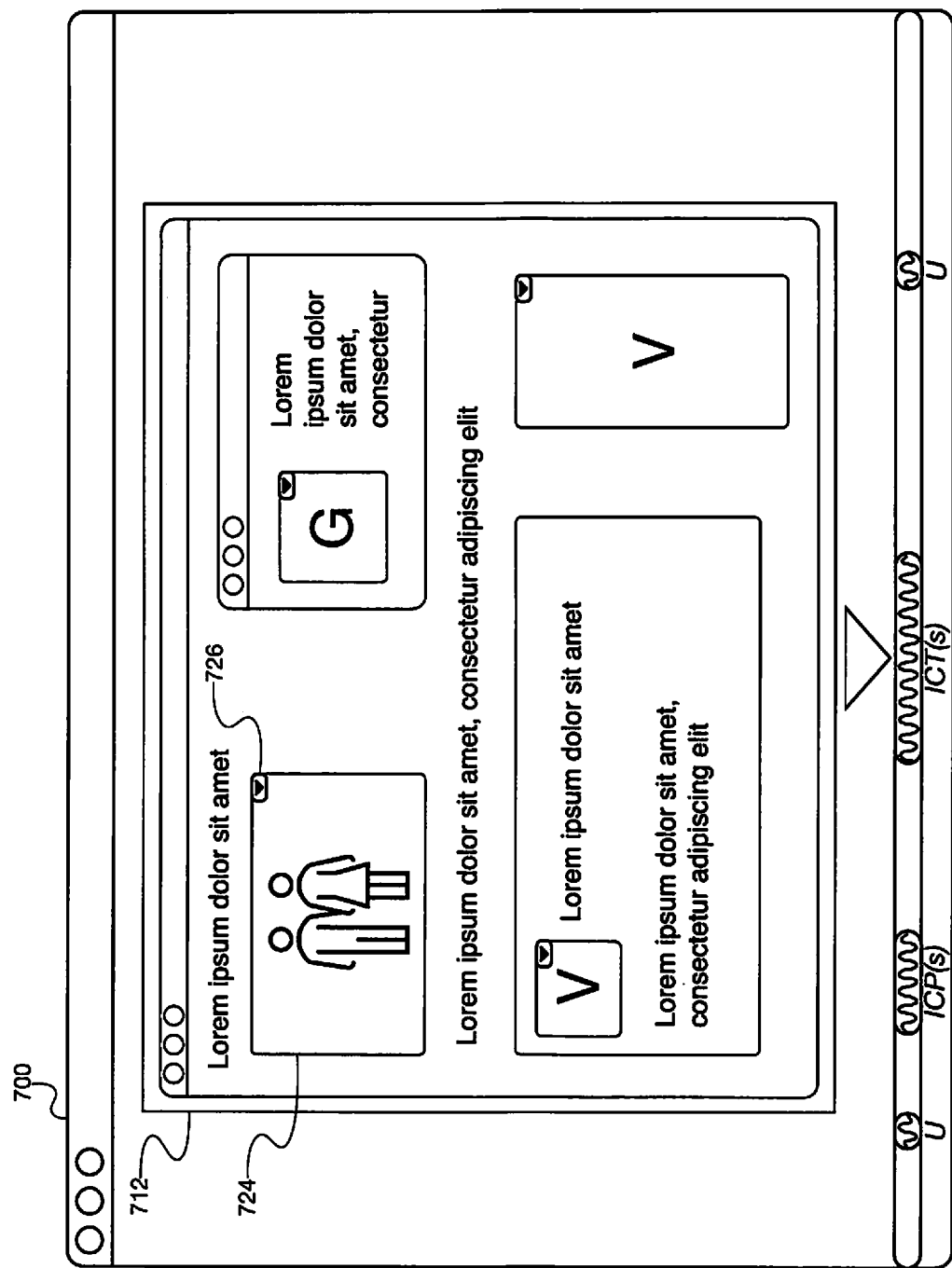

In some embodiments, GUI 700 may include one or more elements for viewing one or more portions of such obscured and/or omitted content. For example, GUI 700 may include element 722, which when invoked may, referring to FIG. 7B, cause GUI 700 to include image 724 (e.g., depicting underlying image 306, an obscured version thereof, and/or the like).

Figure 7C:
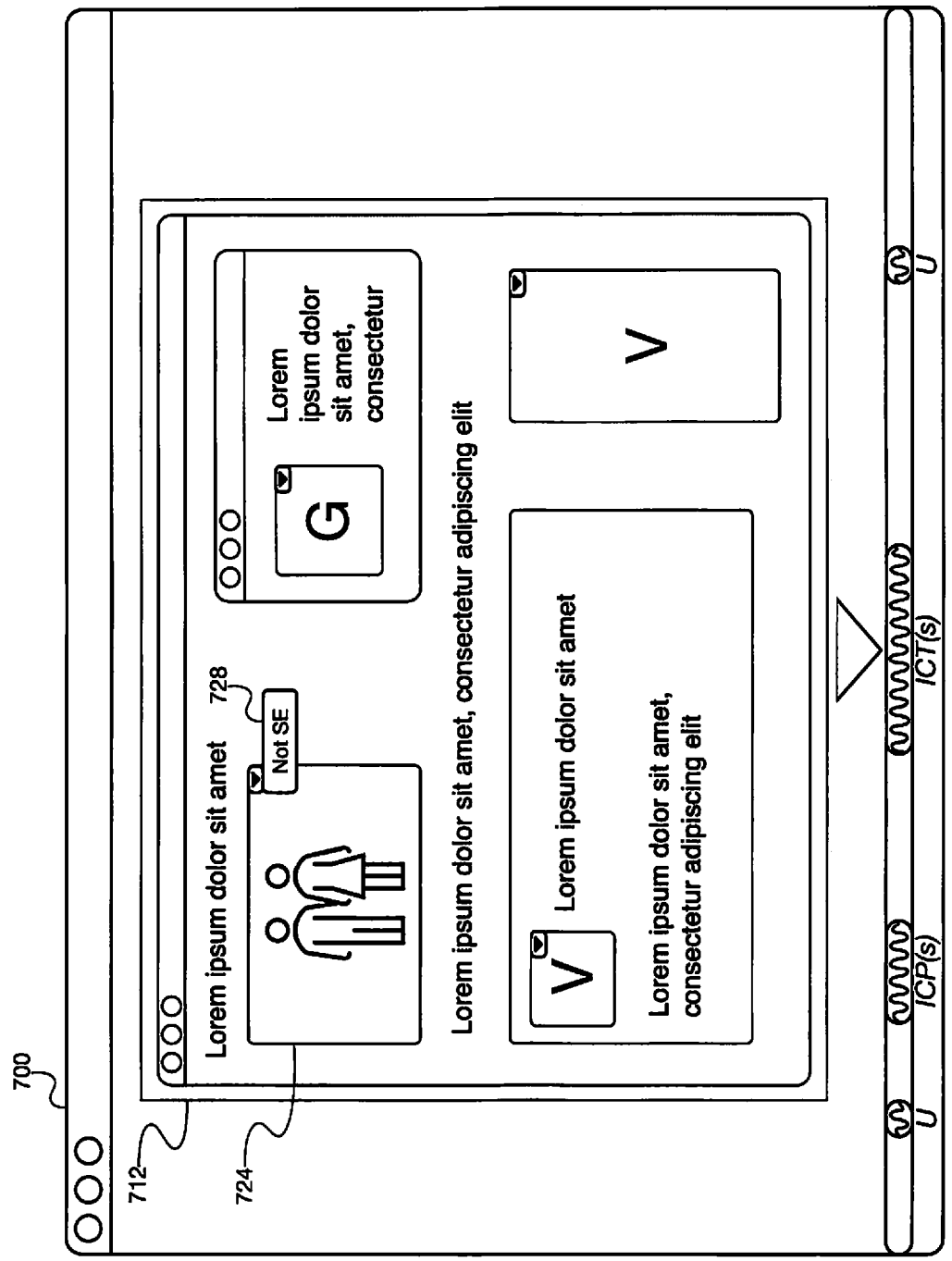

In some embodiments, GUI 700 may include one or more elements for the content supervisor to provide input (e.g., feedback, and/or the like) regarding one or more portions of the interface(s) determined to include content designated for identification. For example, GUI 700 may include element 726, which when invoked may, referring to FIG. 7C, cause GUI 700 to include element 728. In the event the content supervisor determines image 724 does not indicate that image 306 includes content of the determined designated type(s), they may invoke element 728, which may cause computing device 10 to generate data indicating image 306 does not include content of the determined designated type(s) and to communicate such data to computing device 70, which may receive the data.

Figure 8A:
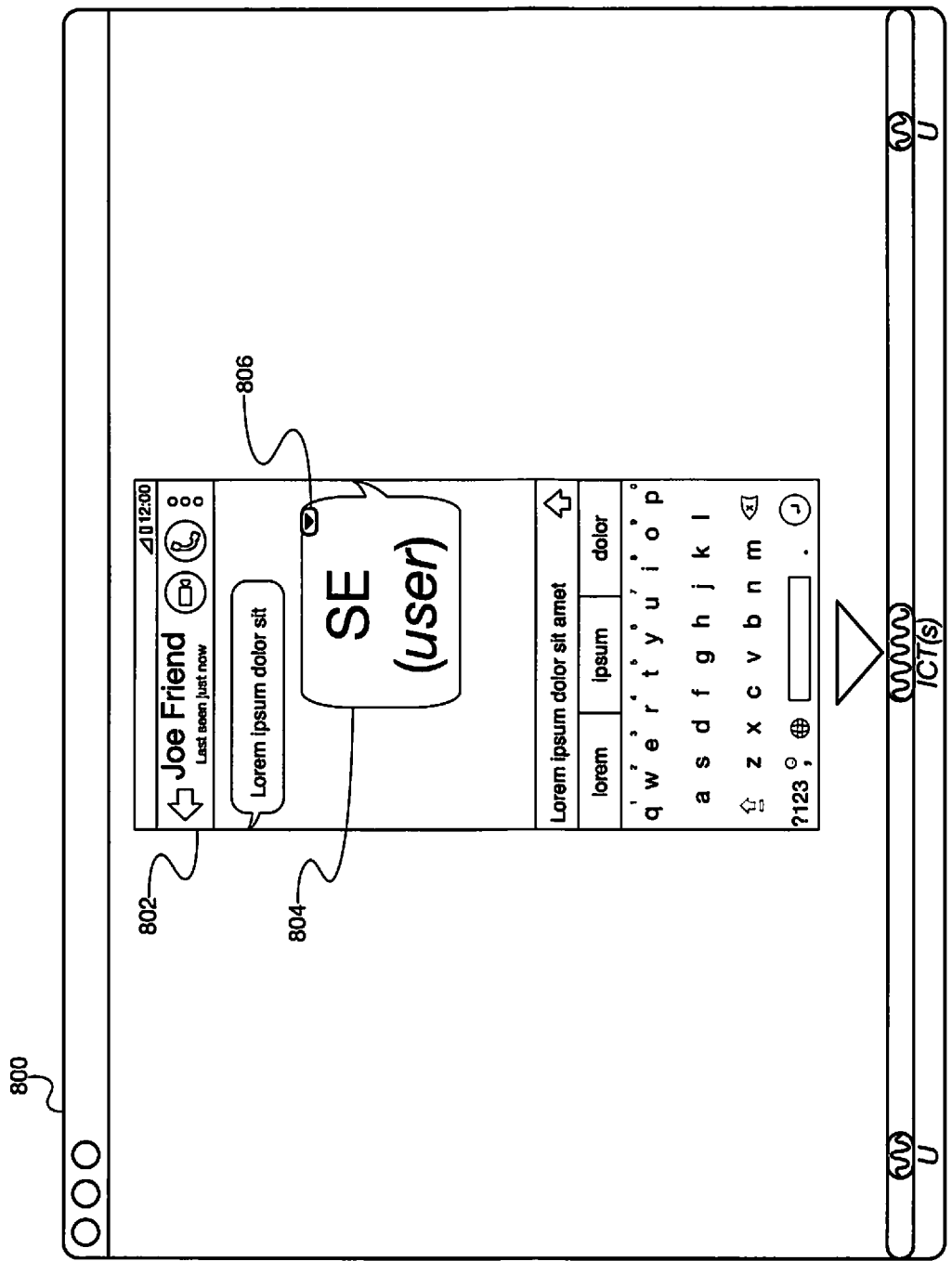

Additionally or alternatively, referring to FIG. 8A, computing device 70 may generate data representing GUI 800 and may communicate such data to computing device 10, which may receive the data.

GUI 800 may include (e.g., in response to interaction with one or more portions thereof, and/or the like) image 802, which may depict one or more portions of the interface(s) depicted by image 400 (e.g., interface(s) including or associated with one or more of the content type(s) and/or pattern(s) designated for identification, and/or the like). GUI 800 may also indicate whether the interface(s) depicted by image 400 include content associated with one or more of the content type(s) and/or pattern(s) designated for identification. For example, GUI 800 may identify (e.g., highlight, frame, and/or the like), within image 802, image 804, which may correspond to image 402.

As illustrated, in some embodiments, image 804 may obscure, omit, and/or the like the content (or portions thereof) of image 402. For example, labels associated with one or more content types determined to be included in the depicted interface portions may be displayed in place of the underlying image content (e.g., the label "SE (user)" for sexually explicit imagery of the user of computing device 30 may be displayed in lieu of image 402, and/or the like).

Figure 8B:
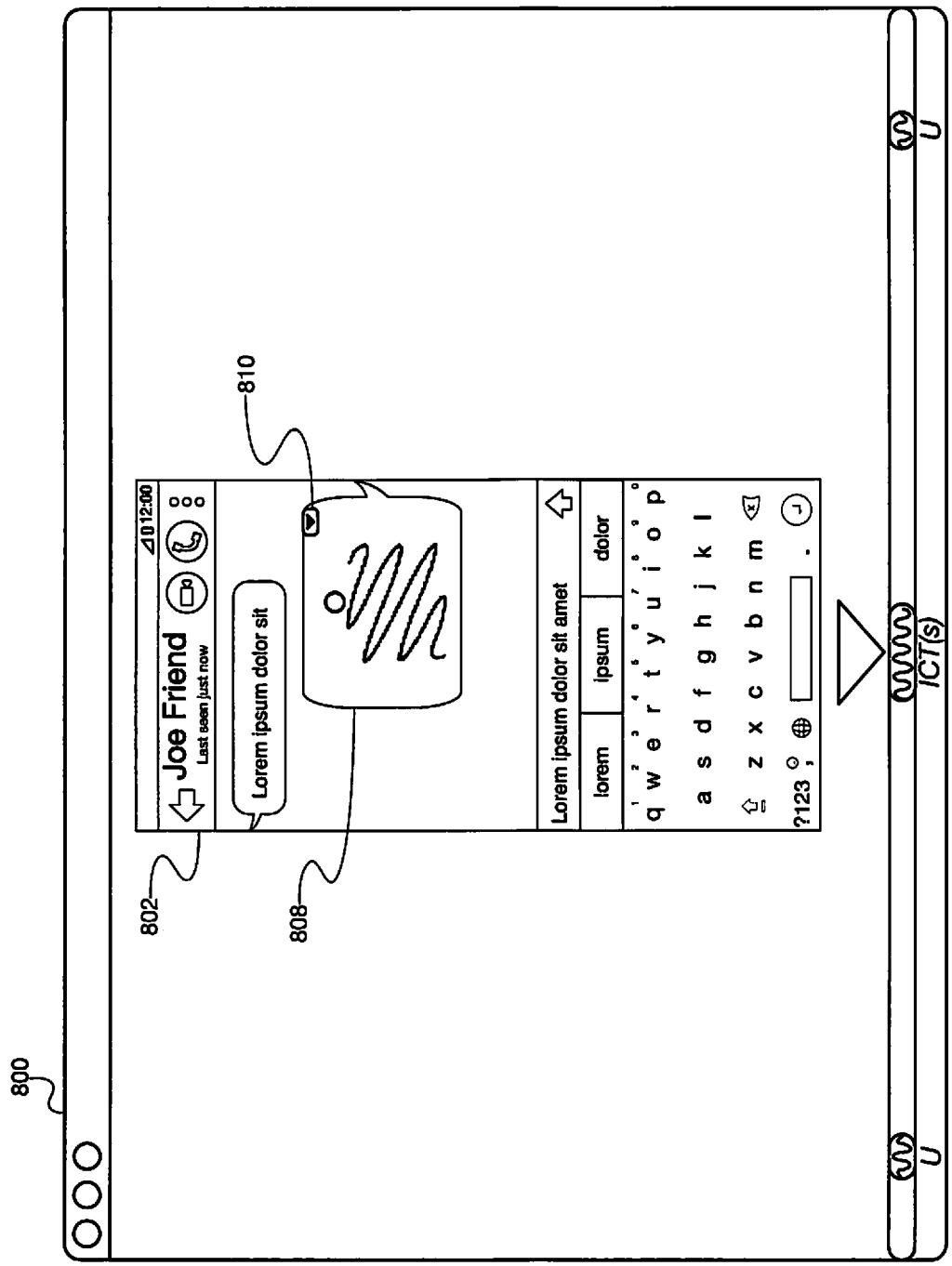

In some embodiments, GUI 800 may include one or more elements for viewing one or more portions of such obscured and/or omitted content. For example, GUI 800 may include element 806, which when invoked may, referring to FIG. 8B, cause GUI 800 to include image 808 (e.g., depicting underlying image 402, an obscured version thereof, and/or the like).

Figure 8C:
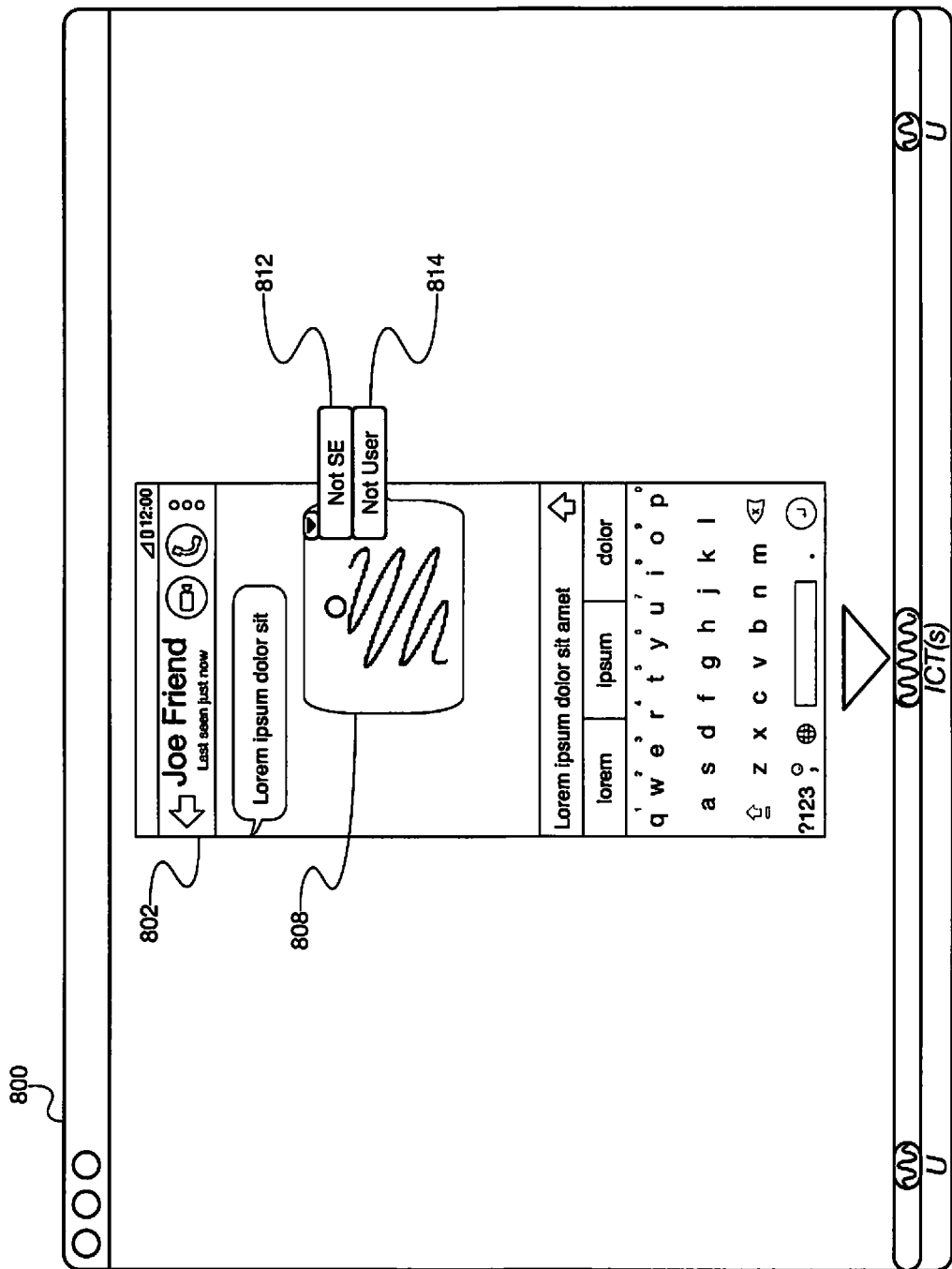

In some embodiments, GUI 800 may include one or more elements for the content supervisor to provide input (e.g., feedback, and/or the like) regarding one or more portions of the interface(s) determined to include content designated for identification. For example, GUI 800 may include element 810, which when invoked may, referring to FIG. 8C, cause GUI 800 to include elements 812 and 814. In the event the content supervisor determines image 808 does not indicate that image 402 includes content of the determined designated type(s), they may invoke element(s) 812 and/or 814, which may cause computing device 10 to generate data indicating image 402 does not include content of the determined designated type(s) and to communicate such data to computing device 70, which may receive the data.

Figure 9A:
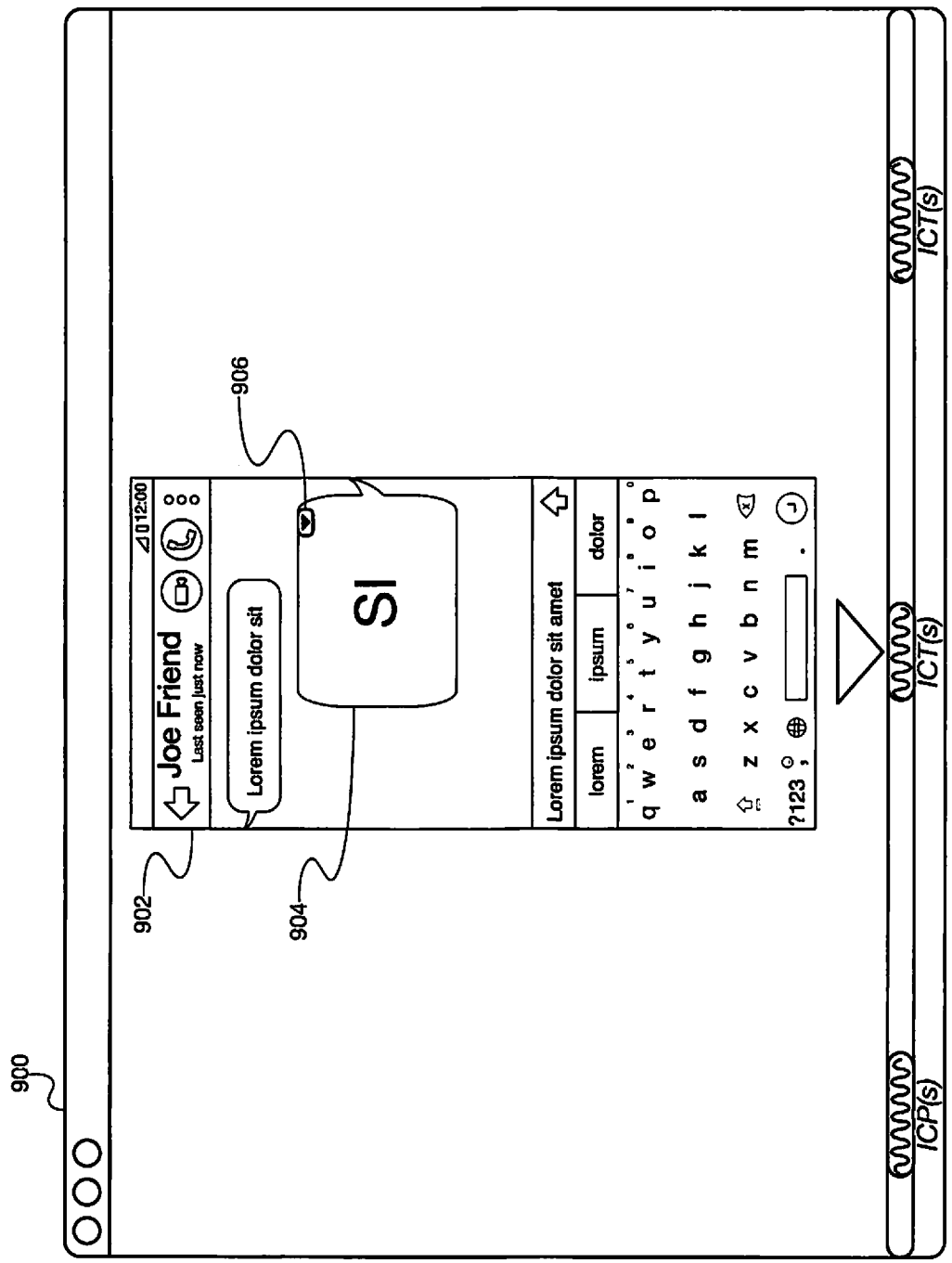

Additionally or alternatively, referring to FIG. 9A, computing device 70 may generate data representing GUI 900 and may communicate such data to computing device 10, which may receive the data.

GUI 900 may include (e.g., in response to interaction with one or more portions thereof, and/or the like) image 902, which may depict one or more portions of the interface(s) depicted by image 500 (e.g., interface(s) including or associated with one or more of the content type(s) and/or pattern(s) designated for identification, and/or the like). GUI 900 may also indicate whether the interface(s) depicted by image 500 include content associated with one or more of the content type(s) and/or pattern(s) designated for identification. For example, GUI 900 may identify (e.g., highlight, frame, and/or the like), within image 902, image 904, which may correspond to image 502.

As illustrated, in some embodiments, image 904 may obscure, omit, and/or the like the content (or portions thereof) of image 502. For example, labels associated with one or more content types determined to be included in the depicted interface portions may be displayed in place of the underlying image content (e.g., the label "SI" for suicidal ideation may be displayed in lieu of image 502, and/or the like).

Figure 9B:
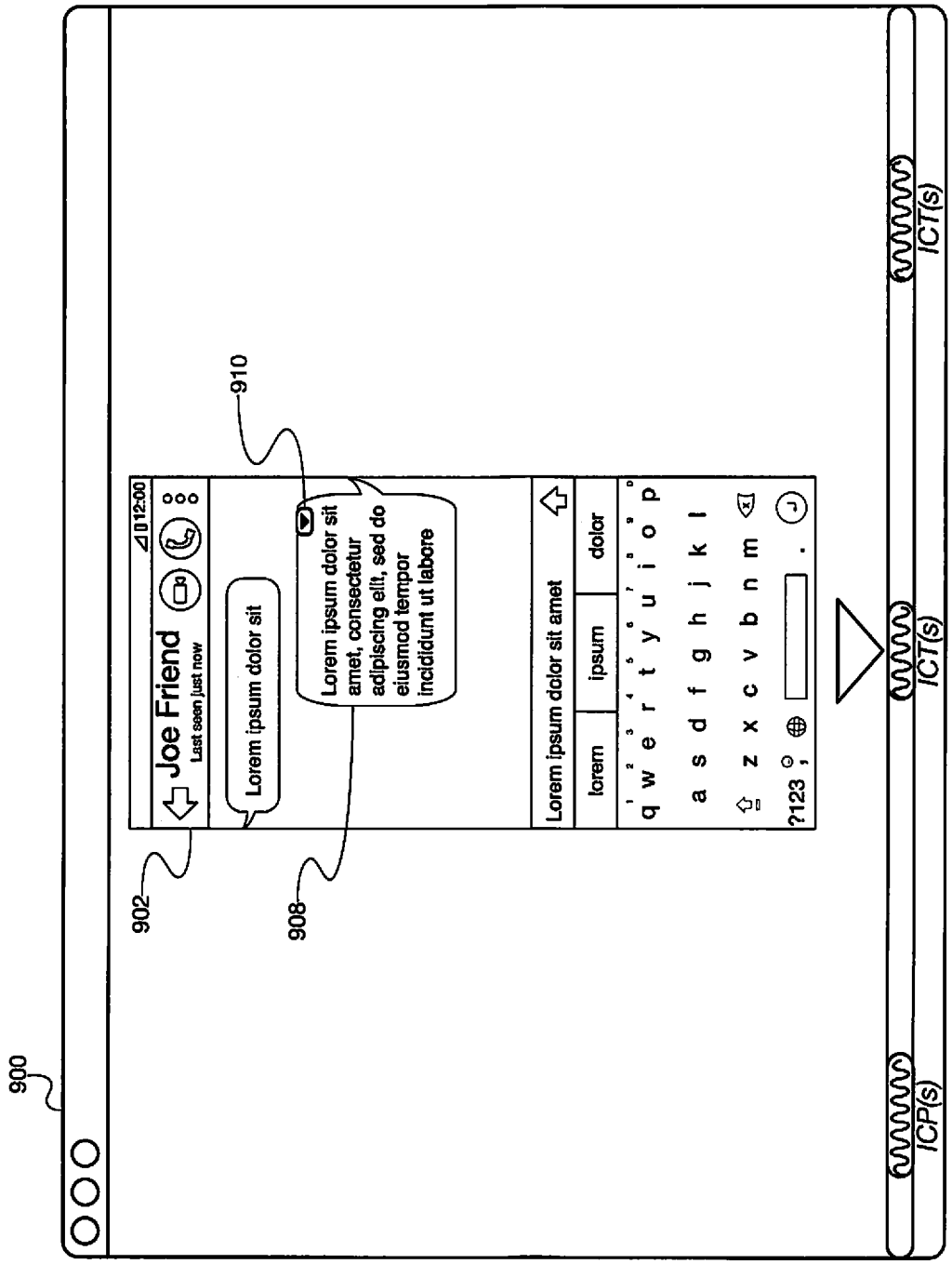

In some embodiments, GUI 900 may include one or more elements for viewing one or more portions of such obscured and/or omitted content. For example, GUI 900 may include element 906, which when invoked may, referring to FIG. 9B, cause GUI 900 to include image 908 (e.g., depicting underlying image 502, an obscured version thereof, and/or the like).

Figure 9C:
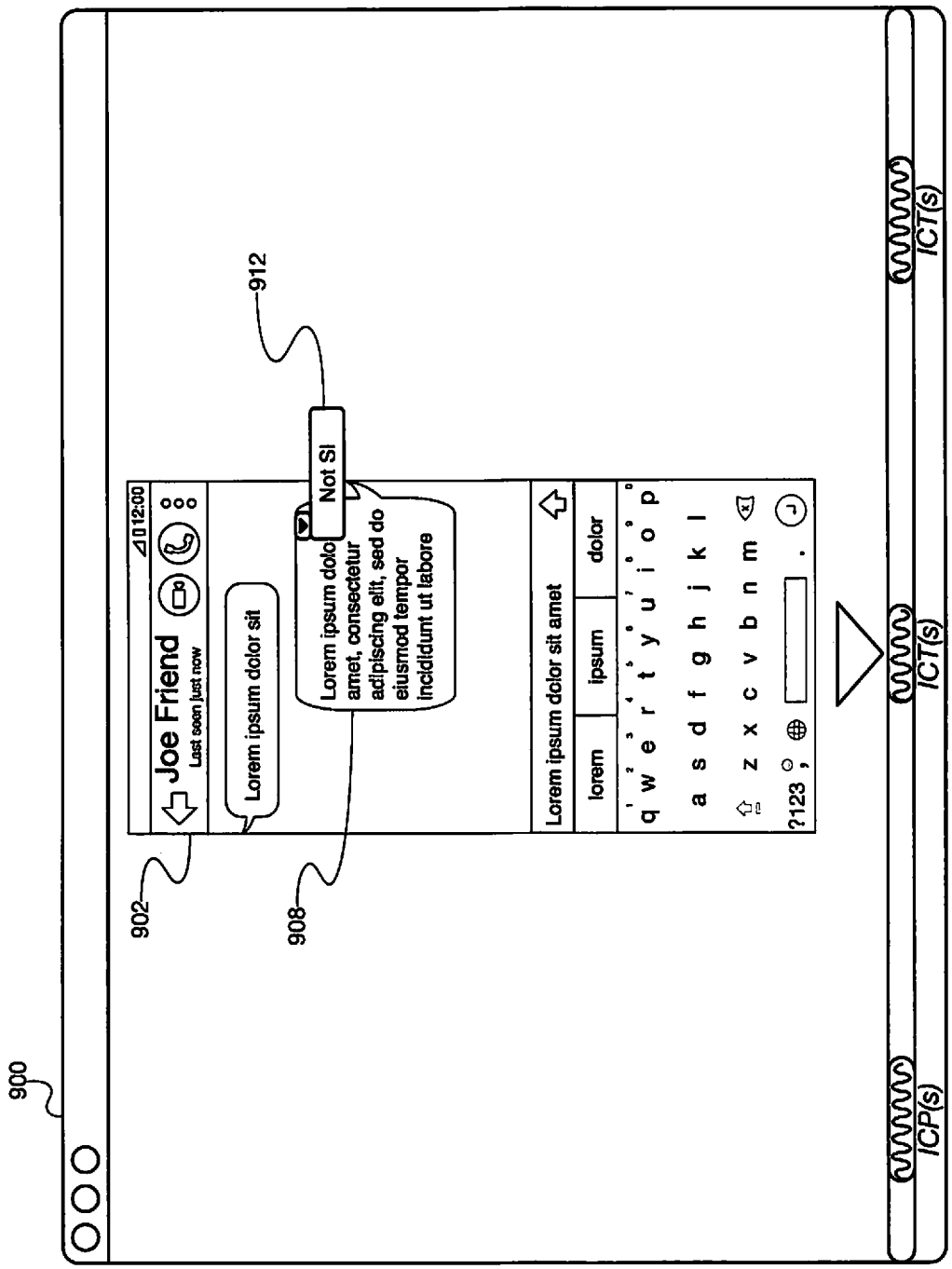

In some embodiments, GUI 900 may include one or more elements for the content supervisor to provide input (e.g., feedback, and/or the like) regarding one or more portions of the interface(s) determined to include content designated for identification. For example, GUI 900 may include element 910, which when invoked may, referring to FIG. 9C, cause GUI 900 to include element 912. In the event the content supervisor determines image 908 does not indicate that image 502 includes content of the determined designated type(s), they may invoke element 912, which may cause computing device 10 to generate data indicating image 502 does not include content of the determined designated type(s) and to communicate such data to computing device 70, which may receive the data.

Returning to FIG. 2C, at (238), computing device 70 may update (e.g., via supervised learning, and/or the like) one or more of the ML model(s), for example, based on feedback provided by the content supervisor (e.g., the data communicated at (236), and/or the like). At (240), computing device 70 may generate data (e.g., representing the updated ML model(s), and/or the like) and may communicate such data to computing device 20, which may receive the data. Similarly, at (242), computing device 70 may generate data (e.g., representing the updated ML model(s), and/or the like) and may communicate such data to computing device 40, which may receive the data.

Figure 10:
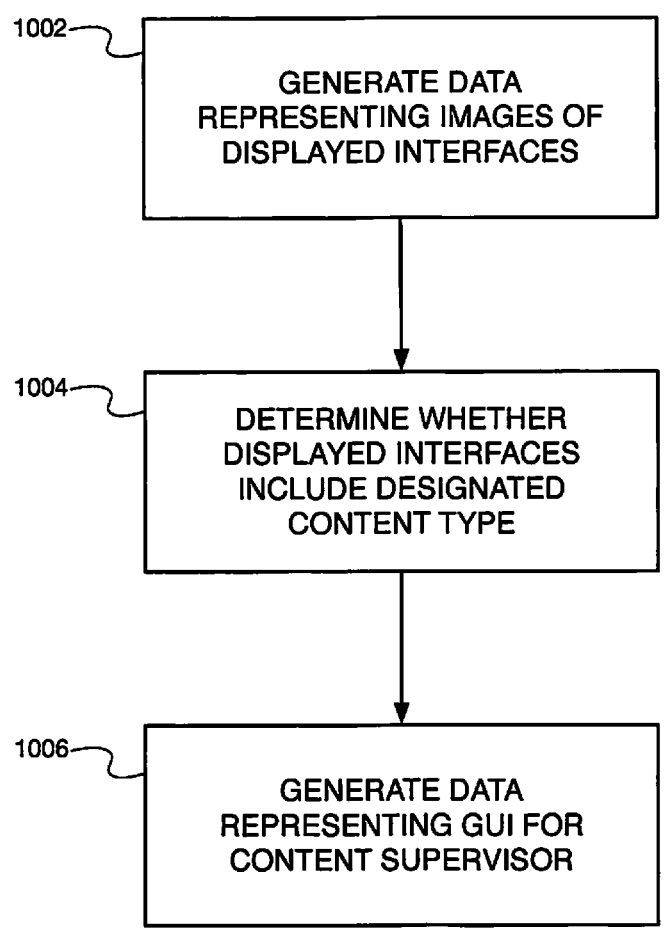
FIGS. 10 and 11 depict example methods according to example embodiments of the present disclosure.
Figure 11:
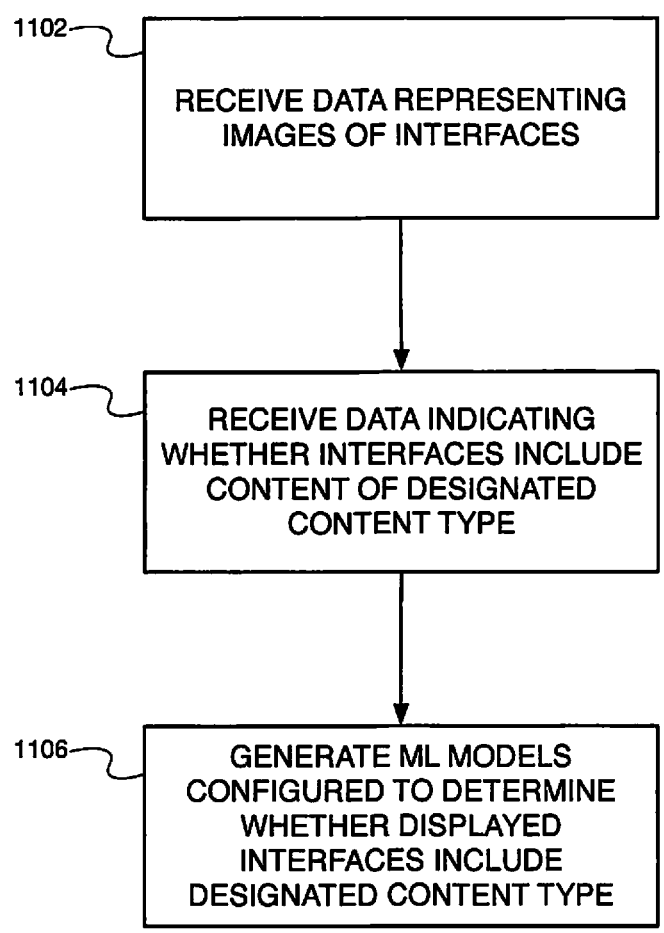

FIGS. 10 and 11 depict example methods according to example embodiments of the present disclosure.

Referring to FIG. 10, at (1002), data representing images of interfaces displayed (e.g., by a device configured to supervise content displayed to a user, and/or the like) may be generated. For example, computing device(s) 20, 30, and/or the like may generate data representing image(s) 300, 400, 500, and/or the like.

At (1004), a determination may be made, based at least in part on one or more ML models and the data representing the images of the interfaces, as to whether the interfaces displayed include content of a type designated (e.g., by a content supervisor, and/or the like) for identification. For example, computing device(s) 20, 40, 70, and/or the like may determine the interface(s) depicted by image(s) 300, 400, 500, and/or the like include sexually explicit imagery, sexually explicit imagery of a user of computing device(s) 20, 30, and/or the like, imagery depicting violence, imagery associated with gambling, social-media content, content associated with bullying, suicidal ideation, psychological concerns, and/or the like.

At (1006), data representing a GUI for presentation to the content supervisor may be generated. The GUI may indicate whether the interfaces displayed by the device include content of the type designated for identification. For example, computing device 70 may generate data representing GUI(s) 700, 800, 900, and/or the like.

Referring to FIG. 11, at (1102), data representing images of interfaces may be received. For example, computing device 70, and/or the like may receive data (e.g., training data, and/or the like) representing images of interfaces (e.g., interfaces associated with various different types of computing devices, operating systems, applications, content types, and/or the like).

At (1104), data indicating, for each image of the images, whether one or more interfaces depicted by the image include content of a type designated (e.g., by a content supervisor, and/or the like) for identification may be received. For example, computing device 70 may receive data (e.g., training data, and/or the like) indicating (e.g., via tagging, markup, and/or the like), for each image of the images, whether one or more interfaces depicted by the image include content comprising sexually explicit imagery, imagery of a user of computing device(s) 20, 30, and/or the like, imagery depicting violence, imagery associated with gambling, social-media content, content associated with bullying, suicidal ideation, psychological concerns, and/or the like.

At (1106), data representing one or more ML models may be generated based at least in part on the data representing the images and the data indicating, for each image of the images, whether one or more interfaces depicted by the image include content of a type designated for identification. The ML model(s) may be configured to determine whether images of interfaces displayed by a user device configured to supervise displayed content depict content within the displayed interfaces of the type designated for identification. For example, computing device 70, and/or the like may generate, based at least in part on the data representing the images of interfaces and the data indicating, for each image of the images, whether one or more interfaces depicted by the image include content of a type designated for identification (e.g., the training data, and/or the like), data representing one or more ML models (e.g., train such model(s), and/or the like) configured to determine whether images of interfaces displayed by computing device(s) 20, 30, and/or the like depict content within the displayed interfaces comprising sexually explicit imagery, sexually explicit imagery of a user of computing device(s) 20, 30, and/or the like, imagery depicting violence, imagery associated with gambling, social-media content, content associated with bullying, suicidal ideation, psychological concerns, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein may be implemented using a single device or component and/or multiple devices or components working in combination. Databases and/or applications may be implemented on a single system and/or distributed across multiple systems. Distributed components may operate sequentially and/or in parallel.

Various connections between elements are discussed in the above description. These connections are general and, unless specified otherwise, may be direct and/or indirect, wired and/or wireless. In this respect, the specification is not intended to be limiting.

The depicted and/or described steps are merely illustrative and may be omitted, combined, and/or performed in an order other than that depicted and/or described; the numbering of depicted steps is merely for ease of reference and does not imply any particular ordering is necessary or preferred.

The functions and/or steps described herein may be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors of a computer and/or other data-processing device. The computer-executable instructions may be stored on a computer-readable medium such as a hard disk, optical disk, removable storage media, solid-state memory, read-only memory (ROM), random-access memory (RAM), or the like. As will be appreciated, the functionality of such instructions may be combined and/or distributed as desired. In addition, the functionality may be embodied in whole or in part in firmware and/or hardware equivalents, such as integrated circuits, application-specific integrated circuits (ASICs), field-programmable gate arrays (FPGAs), or the like. Particular data structures may be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein may be embodied as a method, system, apparatus, and/or one or more computer-readable media storing computer-executable instructions. Accordingly, aspects may take the form of an entirely hardware embodiment, an entirely software embodiment, an entirely firmware embodiment, and/or an embodiment combining software, hardware, and/or firmware aspects in any combination.

As described herein, the various methods and acts may be operative across one or more computing devices and/or networks. The functionality may be distributed in any manner or may be located in a single computing device (e.g., server, client computer, user device, or the like).

Aspects of the disclosure have been described in terms of illustrative embodiments thereof. Numerous other embodiments, modifications, and/or variations within the scope and spirit of the appended claims may occur to persons of ordinary skill in the art from a review of this disclosure. For example, one of ordinary skill in the art may appreciate that the steps depicted and/or described may be performed in other than the recited order and/or that one or more illustrated steps may be optional and/or combined. Any and all features in the following claims may be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment may be used with another embodiment to yield a still further embodiment. Thus, it is intended that the present disclosure cover such alterations, variations, and/or equivalents.

What is claimed is:

1. A method comprising:
   generating, by one or more computing devices, data representing a plurality of images of interfaces displayed by a device configured to supervise content displayed to a user;
   determining, by the one or more computing devices and based at least in part on one or more machine learning (ML) models and the data representing the plurality of images, whether the interfaces displayed by the device include content of a type designated by a content supervisor of the user for identification;
   determining, by the one or more computing devices, based at least in part on the one or more ML models, for at least one image of the images of interfaces displayed by the device, and based at least in part on multiple values representing likelihoods that bounded regions within one or more interfaces depicted by the image include content of the type designated for identification, a value representing a likelihood that the one or more interfaces depicted by the image include content of the type designated for identification; and
   generating, by the one or more computing devices, data representing a graphical user interface (GUI) for presentation to the content supervisor, the GUI indicating whether the interfaces displayed by the device include content of the type designated for identification.

2. The method of claim 1, wherein determining whether the interfaces include content of the type designated for identification comprises determining whether the interfaces include sexually explicit imagery.

3. The method of claim 1, wherein determining whether the interfaces include content of the type designated for identification comprises determining whether the interfaces include sexually explicit imagery of the user.

4. The method of claim 1, wherein determining whether the interfaces include content of the type designated for identification comprises determining whether the interfaces include imagery depicting violence.

5. The method of claim 1, wherein determining whether the interfaces include content of the type designated for identification comprises determining whether the interfaces include imagery associated with gambling.

6. The method of claim 1, wherein determining whether the interfaces include content of the type designated for identification comprises determining whether the interfaces include social-media content.

7. The method of claim 1, wherein determining whether the interfaces include content of the type designated for identification comprises determining whether the interfaces include content associated with at least one of bullying, suicidal ideation, or psychological concerns.

8. The method of claim 1, wherein:
the device configured to supervise content displayed to the user comprises a user device that displayed the interfaces;
generating the data representing the plurality of images of the interfaces comprises generating, by the user device, the data representing the plurality of images of the interfaces;
determining whether the interfaces include content of the type designated for identification comprises determining, by the user device, whether the interfaces include content of the type designated for identification;
generating the data representing the GUI for presentation to the content supervisor comprises generating, by a computing device physically distinct and remotely located from the user device, the data representing the GUI for presentation to the content supervisor; and
the method comprises communicating, by the user device, to the computing device physically distinct and remotely located from the user device, and via one or more networks, data indicating whether the interfaces include content of the type designated for identification.

9. The method of claim 1, wherein:
the device configured to supervise content displayed to the user comprises a user device that displayed the interfaces;
generating the data representing the plurality of images of the interfaces comprises generating, by the user device, the data representing the plurality of images of the interfaces;
determining whether the interfaces include content of the type designated for identification comprises determining, by a computing device physically distinct and remotely located from the user device, whether the interfaces include content of the type designated for identification; and
the method comprises communicating, by the user device, to the computing device physically distinct and remotely located from the user device, and via one or more networks, the data representing the plurality of images of interfaces displayed by the user device.

10. The method of claim 1, comprising:
receiving, by the one or more computing devices, feedback data generated based at least in part on input provided by the content supervisor via the GUI confirming whether the interfaces displayed by the device include content of the type designated for identification; and
updating, by the one or more computing devices and based at least in part on the feedback data, the one or more ML models.

11. The method of claim 1, comprising determining, by the one or more computing devices and based at least in part on the one or more ML models, one or more bounded regions within the interfaces displayed by the device that include content of the type designated for identification.

12. The method of claim 11, wherein generating the data representing the GUI comprises generating data identifying the one or more bounded regions within the interfaces displayed by the device that include content of the type designated for identification.

13. The method of claim 11, comprising determining, by the one or more computing devices, based at least in part on the one or more ML models, and for each bounded region of the one or more bounded regions within the interfaces, a value representing a likelihood that the bounded region includes content of the type designated for identification.

* * * * *